No. 683,890. Patented Oct. 1, 1901.
A. C. WOLFE.
APPARATUS FOR LOADING OR UNLOADING POTTERY KILNS.
(Application filed Dec. 26, 1899.)
(No Model.) 2 Sheets—Sheet 1.
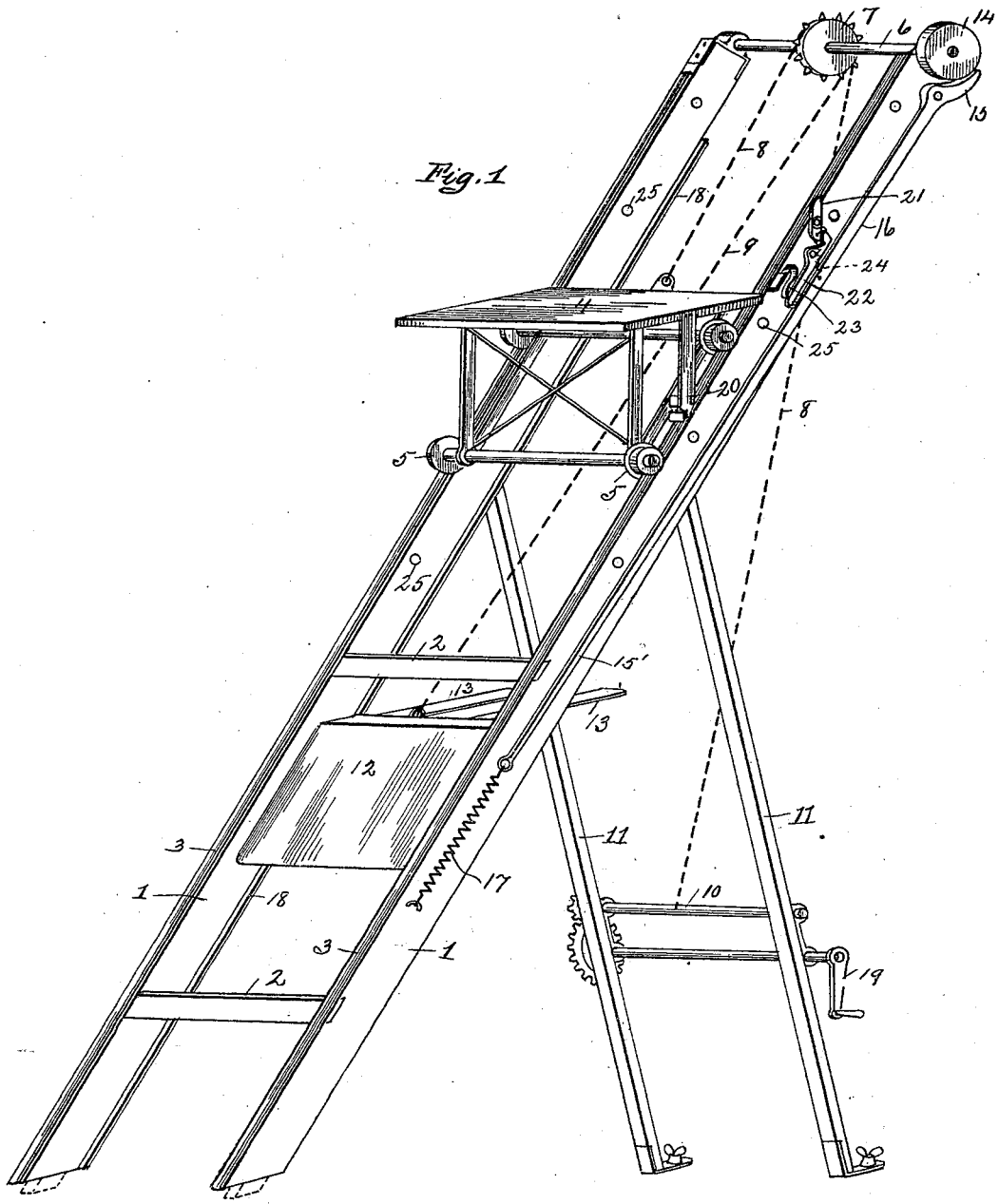

No. 683,890. Patented Oct. 1, 1901.
A. C. WOLFE.
APPARATUS FOR LOADING OR UNLOADING POTTERY KILNS.
(Application filed Dec. 26, 1899.)
(No Model.) 2 Sheets—Sheet 2.
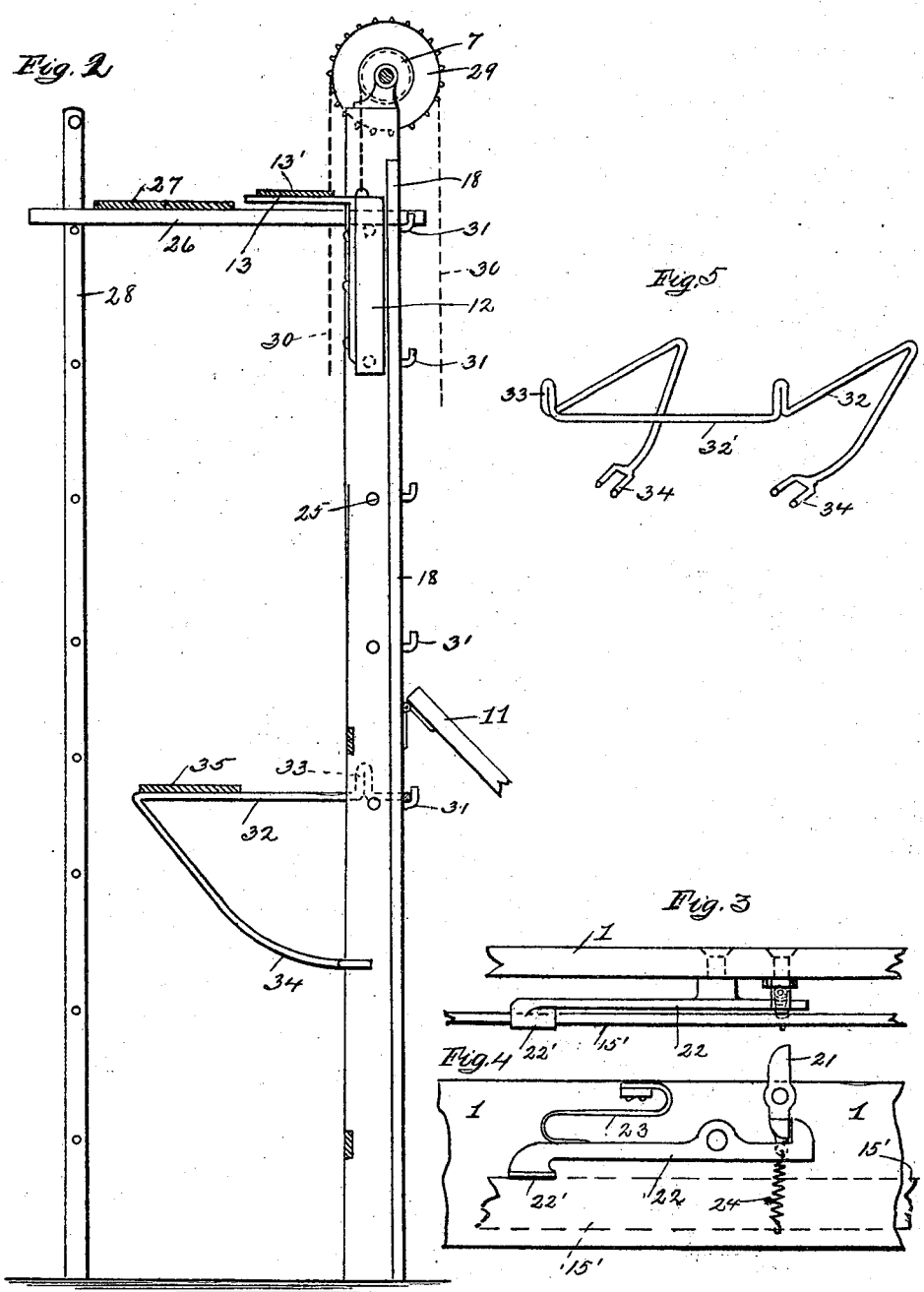

UNITED STATES PATENT OFFICE.

ANDREW C. WOLFE, OF FREEPORT, PENNSYLVANIA, ASSIGNOR OF ONE-THIRD TO JOSEPH F. HEWITT, OF ALLEGHENY, PENNSYLVANIA.

APPARATUS FOR LOADING OR UNLOADING POTTERY-KILNS.

SPECIFICATION forming part of Letters Patent No. 683,890, dated October 1, 1901.

Application filed December 26, 1899. Serial No. 741,544. (No model.)

*To all whom it may concern:*

Be it known that I, ANDREW C. WOLFE, a citizen of the United States of America, residing at Freeport, (Freeport P. O.,) in the county of Armstrong and State of Pennsylvania, have invented certain new and useful Improvements in Apparatus for Loading or Unloading Pottery-Kilns; and I do hereby declare the following to be a full, clear, and exact description thereof, reference being had to the accompanying drawings, which form a part of this specification.

My invention relates to an improved apparatus for loading and unloading pottery-kilns; and it consists in certain details of construction and combination of parts, as will be fully described hereinafter.

In the accompanying drawings, Figure 1 is a perspective view of my improved apparatus for loading and unloading pottery-kilns, the same being shown in a position for unloading the kiln. Fig. 2 is a side elevation of a modified form of the same apparatus arranged in a vertical position and used in connection with an ordinary ladder, whereby a platform is formed upon which the operator stands while loading the kiln. An adjustable and removable platform is also shown in connection with the said figure. Fig. 3 is an enlarged detailed plan view of a portion of the mechanism for locking and holding the car stationary. Fig. 4 is a side elevation of the same. Fig. 5 is a perspective view of a modified form of an adjustable and detachable platform-frame used to support the operator while removing the saggars from the elevator or car.

To construct an apparatus in accordance with my invention, and thereby provide a means for loading and unloading pottery-kilns, I provide two beams 1 of a suitable length and attach the same together by means of cross-pieces 2 to form a track 3 and support for a traveling carriage or lift 4. These supports or frame 1 is arranged in an inclined position and supported either upon the walls of the kiln or upon the contents of the same or upon suitable legs 11, as shown at Fig. 1 of the drawings. Arranged in suitable bearing at the top of the frame 1 is a shaft 6, upon which is mounted a sprocket-wheel 7, over which a chain belt 8 is operated, the one end of which is attached to the car or lift 4 and the other to the spindle 10 of a crab 19, of ordinary construction, by means of which the car may be elevated or lowered at will.

When handling light articles, the above-described crab 19 is dispensed with and a large sprocket-wheel 29, attached to the shaft 6, used, (see Fig. 2, which shows a modification of my device,) the said wheel being provided with an endless chain 30, by means of which the said shaft 6 may be revolved and the car connected to a counterweight 12. This weight 12 is arranged to travel upon suitable guides 18 and is used to balance the car, leaving the operator only the weight of the saggar to lift.

To regulate the descent or downward movement of the car 4, the shaft 6 is fitted with a brake-wheel 14, a brake-shoe 15, and connected lever 15', provided with a spring 17 to keep the said shoe at all times in contact with the wheel 14. Arranged in connection with the brake-lever 15' is an automatically-operated means for engaging with the car 4 to hold the same stationary in an elevated position, the said means consisting of a bar 20, rigidly attached to one side of the car 4, adapted to engage with a pivoted bolt 21, held in its normal position by a spring 24 (see Figs. 3 and 4) and the said bolt held by a latch-lever 22, pivoted to the frame 1, and the one end 22' resting upon the brake-lever 15'. This latch-lever 22 is provided with a spring 23 to hold the same engaged with the bolt 21 and is operated by the upward movement of the brake-lever 15', which movement will compress the spring 23 and release the brake and the bolt from the bar 20 and permit the car 4 to descend.

In operation the pottery to be burned is placed in saggars in a manner well known in the art and the said saggars placed upon the car 4 and conveyed upward either by means of the power-crab 19 or the endless chain belt 30. The car 4 when at the top will engage with the bolt 21 and will be held stationary by means of the same until its load is removed. The operator at the bottom of the apparatus now elevates the lever 15', which releases the brake and latch and permits the car to descend for another load.

The apparatus above described being light can easily be moved to various positions about the kiln and from one kiln to another, as is obvious.

To unload the saggars from the kilns after the burning of the pottery, the frame 1 is arranged in a vertical position, as shown at Fig. 2 of the drawings, which is a modification, and is used in connection with an ordinary ladder 28, by means of which a platform is formed, the frame 26 of which rests upon the steps of the same and upon pins arranged in openings 25, formed in the beams of the frame 1. This platform 27 is used by the operator at the top of the kiln to stand upon while placing the saggars upon the lift 13'. The lift in this case consists of two brackets 13, attached to the counterweight 12, fitted with a platform 13', and is operated in the same manner as the car 4, previously described.

In the place of the platform 27, above described, I have shown at Figs. 2 and 5 of the drawings modifications of a frame which may be attached to the beams 1, the said frame consisting of a piece of bar-iron bent in peculiar form, the straight portion 32' of which engages hooks 31, arranged at the back of the uprights 1, while the portions 34 rest upon the edges of the said uprights, the parts 33 serving as a means of holding the cross-bars 26 in position.

It is understood that when the device shown in Fig. 1 is used the hooks 31 are dispensed with, as well as the ladder 28, and a different-formed lift 4 is used than the lift 13'. (Shown in Fig. 2.)

If it is desired, the above-described support may be used and the ladder 28 dispensed with and a platform 35 arranged upon the support, as shown at the lower portion of the standards 1 at Fig. 2 of the drawings.

It is obvious that various modifications and changes may be made in the details of construction without departing from the spirit of the invention.

Having thus described my invention, I claim—

1. In combination, a frame forming a track, a car or lift supported on said frame, a spring-latch for holding said car or lift in the desired position, a brake-wheel, and a brake-lever, the latter adapted to release both the brake and the spring-latch, substantially as described.

2. In combination, a frame, a car or lift, a shaft mounted in the upper end of the frame, a sprocket-wheel carried by said shaft, a crab or windlass, a chain connected to said crab or windlass and to the car or lift, said chain passing over said sprocket-wheel, and a spring-latch connected to the frame and adapted to engage the car to hold the latter at the top of the frame, substantially as described.

3. In combination, a frame forming a track, a shaft journaled in the upper end thereof, a brake-wheel carried by said shaft, a sprocket-wheel carried by the shaft, a car or lift operating on the frame, means for operating the car or lift, a latch carried by the frame for holding the car or lift at the top of the frame, and a brake-lever adapted to automatically release the brake and latch, substantially as described.

In testimony whereof I have hereunto affixed my signature in the presence of two subscribing witnesses.

ANDREW C. WOLFE.

Witnesses:
JOHN GROETZINGER,
H. E. BECKER.